Feb. 3, 1959  R. H. SAMDAHL  2,871,580
DANCE INSTRUCTION DEVICE
Filed June 21, 1956  5 Sheets-Sheet 1
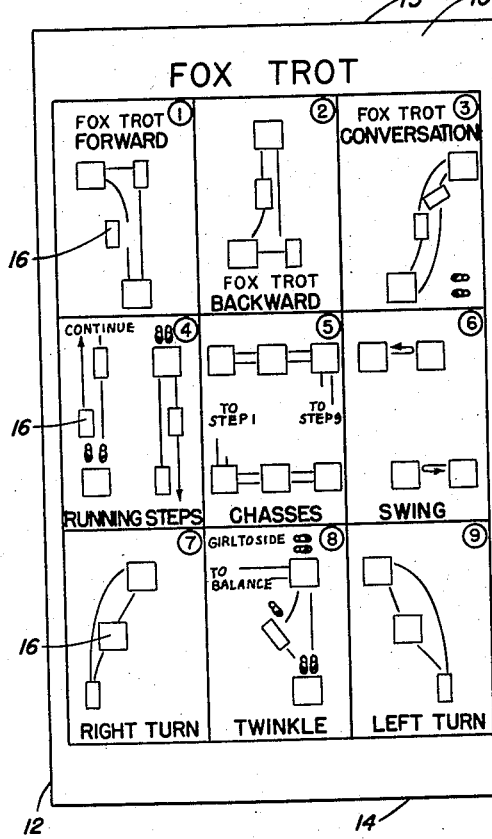
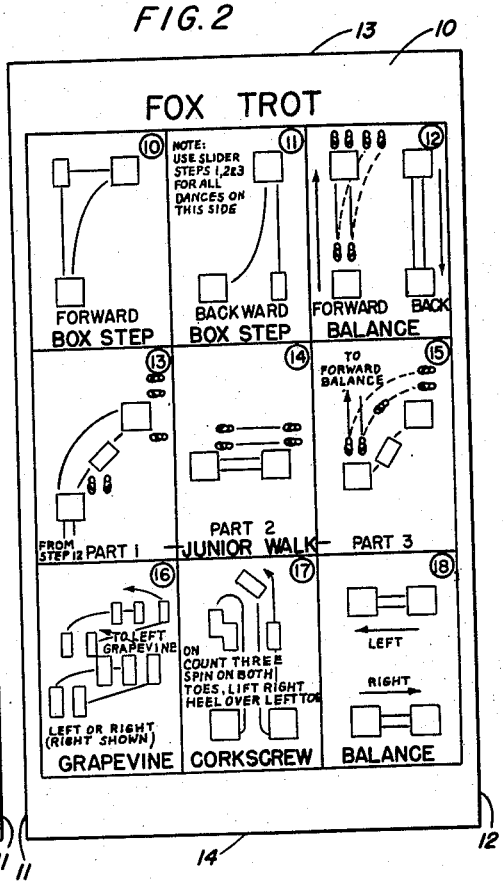
INVENTOR.
RUSSELL H. SAMDAHL
BY
Attorney Feb. 3, 1959 R. H. SAMDAHL 2,871,580
DANCE INSTRUCTION DEVICE
Filed June 21, 1956 5 Sheets-Sheet 2

INVENTOR.
RUSSELL H. SAMDAHL
BY
Attorney

Feb. 3, 1959  R. H. SAMDAHL  2,871,580
DANCE INSTRUCTION DEVICE
Filed June 21, 1956  5 Sheets-Sheet 3

INVENTOR.
RUSSELL H. SAMDAHL
BY
John E. Deil
Attorney

Feb. 3, 1959 R. H. SAMDAHL 2,871,580
DANCE INSTRUCTION DEVICE
Filed June 21, 1956 5 Sheets-Sheet 4
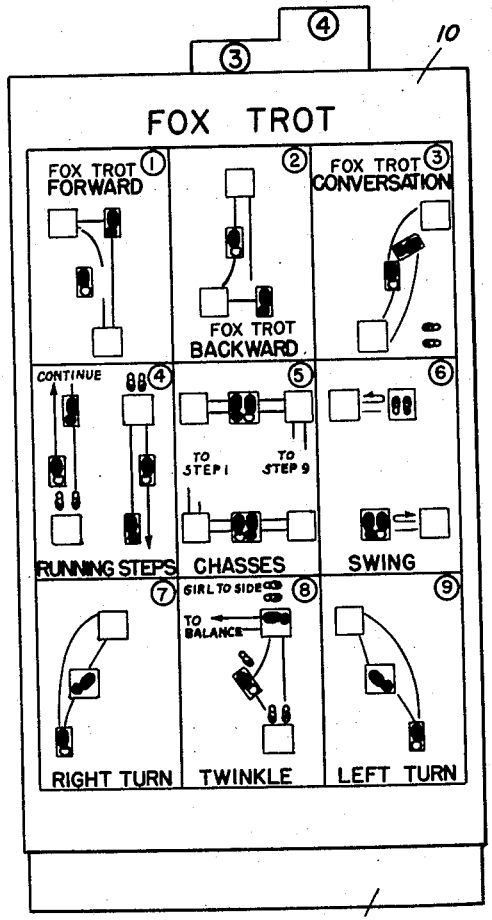
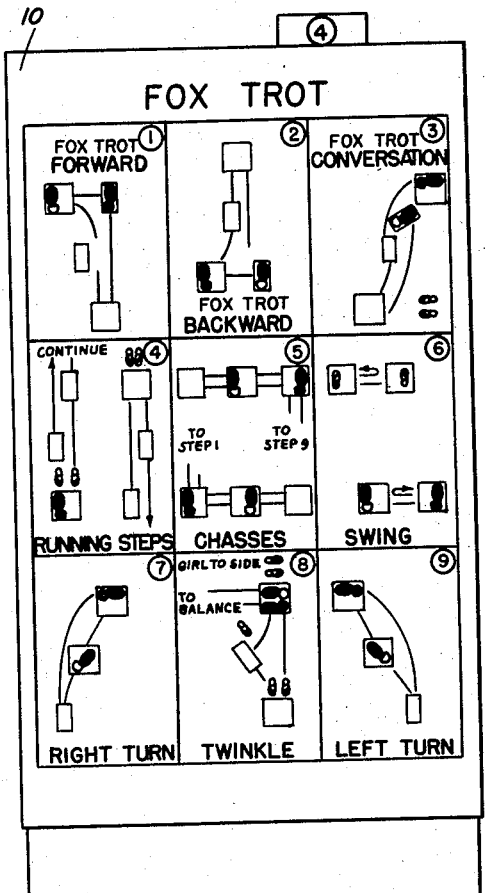
INVENTOR.
RUSSELL H. SAMDAHL
BY
Attorney Feb. 3, 1959 R. H. SAMDAHL 2,871,580
DANCE INSTRUCTION DEVICE
Filed June 21, 1956 5 Sheets-Sheet 5

INVENTOR.
RUSSELL H. SAMDAHL
BY
Attorney

UnitedStates Patent Office 2,871,580
Patented Feb. 3, 1959

2,871,580

DANCE INSTRUCTION DEVICE

Russell H. Samdahl, San Jose, Calif., assignor to George W. Forrand, Madison, Wis.

Application June 21, 1956, Serial No. 592,962

2 Claims. (Cl. 35—29)

This invention relates to an instruction device for social dancing and more particularly to a sequential placement indicator for foot placement in carrying out routinized repetitive pedal exercises constituting the choreography of social dancing.

Books and charts have heretofore described in detail the desirable sequences of pedal placement for carrying out preferred "steps" or choreographic routines used in social dancing. Such descriptions are difficult to follow and also particularly difficult for a novice dancer to understand.

My invention abrogates the difficulties involved in learning to dance by making it possible for a person learning to dance to easily observe the positions in which his feet should be placed in proper sequence and proper relationship for such placement. I accomplish this by providing an envelope having a plurality of windows in at least one side thereof and a sliding member disposed in said envelope and carrying thereon printed representations of footprints which may be caused to appear successively and sequentially in proper position through said windows by sliding said inserted member successively into a series of longitudinally spaced-apart positions within said envelope. The proper positions are indicated by rectangularly extended portions or notches of said slider extending from one end thereof in preferably "stair-step" fashion so that by first pressing the edge of the lowest "stair-step" notch so that the sliding member slides through the envelope until said edge is adjacent the top edge of the envelope, the footprints appearing through the windows indicate the initial position in which the feet should be placed in beginning each of a number of dance steps. By then placing a finger on the second notch and causing the sliding member to slide until said edge is adjacent the edge of the envelope, a new group of foot print symbols is caused to appear through the windows and these now indicate the next sequential position in which the feet should be placed. As many such stair steps as necessary may be provided to indicate the desired sequence.

It is therefore an object of the invention to provide a device wherein footprints illustrating successive proper foot placement for carrying out a number of dance steps may be observed by causing a sliding member to be sequentially positioned longitudinally with respect to a windowed non-sliding member.

Another object is to provide such a device wherein an indication of the proper placement for the feet in carrying out a dance step may be observed by a dancer by sequential digital operation of the device.

A further object is such a device wherein such indicia may be relatively easily caused to appear in time to music of any desired rhythmical pattern.

Further objects will become apparent from the drawings and the following detailed description, in which it is my intention to illustrate the applicability of the invention without thereby limiting its scope to less than that of all those equivalents which will be apparent to one skilled in the art.

Like reference numbers refer to like parts and:

Figure 1 is an elevation of the obverse side of an envelope member;

Figure 2 is an elevation of the reverse side of an envelope member;

Figures 6, 7, 8, 9 and 10 are elevations of the obverse side of the device of the invention showing the sequence of steps in its operation.

Figure 3:
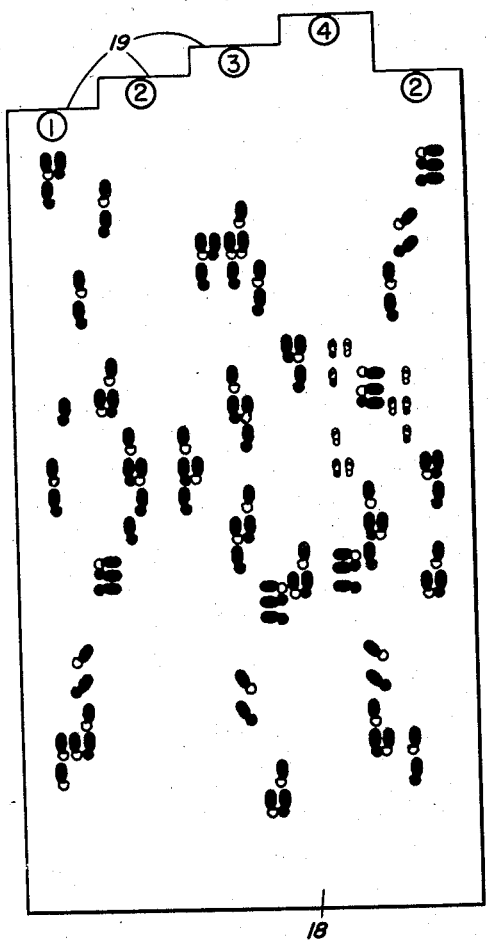
Figure 3 is an elevation of the obverse side of a sliding member.

Referring now to the drawings, there is shown an envelope member 10 which is preferably closed at its sides 11 and 12 and is open at its ends 13 and 14. In the envelope member 10 there may be inserted a sliding member 18. Envelope member 10 may be made of a transparent plastic such as cellulose acetate and may be printed over each of its outer surfaces in such manner as to block out or make opaque all of the surface except certain window portions 16 which may remain transparent. Alternatively envelope 10 may be made of paper or cardboard or the like and may have cut out from each surface thereof a plurality of quadrilateral apertures to provide windows 16. Sliding member 18 may be made of opaque sheet plastic, cardboard, bristol board or the like, and have printed on at least one side thereof, and preferably on each side thereof, a plurality of foot-print symbols. One end of sliding member 18 is notched in stair-step fashion, as shown at 19, and the notches, which may have the form of stair-steps as shown, may suitably be numbered with numerals such as 1, 2, 3 and 4.

As shown in Figures 6 to 10, slider 18 may be slidably operated with respect to member 10 by successive digital pressure on notches 19; indicia in the form of footprint symbols may thereby be caused successively to appear through said windows and indicate proper sequence of pedal placement in carrying out a plurality of dance steps.

Figure 6:
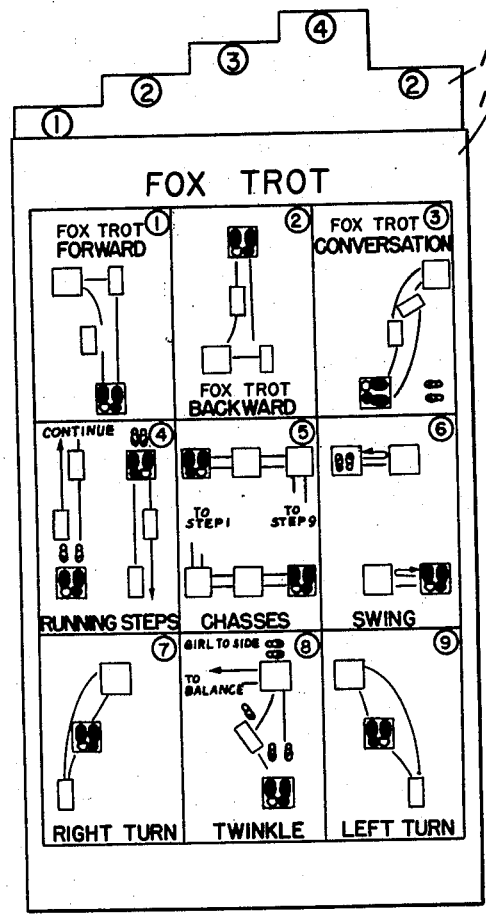

Thus as shown in Figures 1 and 6, the windows in the face of one side of member 10 may be disposed in groups adapted to provide suitable indications for dance steps, as indicated thereon, such as the forward step which may be executed to Fox Trot rhythm designated "Fox Trot Forward"; the backward step in the Fox Trot designated "Fox Trot Backward"; the conversation step in the Fox Trot designated "Fox Trot Conversation"; running steps in the Fox Trot designated "Running Steps"; chasses in the Fox Trot designated "Chasses"; the swing step designated "Swing"; right and left turns in the Fox Trot designated respectively "Right Turn" and "Left Turn"; the twinkle step in Fox Trot rhythm designated "Twinkle."

The footprint symbols appearing through the windows may indicate proper placement for the feet of a man during the designated dance step, it being understood that a woman dancing with him as his partner places her feet in correspondingly opposite position.

The standing position prior to beginning the dance step may be indicated, as shown in Figure 6, by causing the bottom edge of the sliding member to be adjacent to the bottom edge of windowed member 10. The footprint symbols may suitably be coded to show which foot is to bear the weight of the body; thus, as shown, the heel of a footprint symbol may be made black if the weight of the body is to be carried on the indicated foot and may be made white if substantially no weight is to be carried on the indicated foot.

Thus, as shown in Figure 6 the beginning position for a man in carrying out a Forward Fox Trot step requires that his feet be placed side by side with the heels nearly touching and the body weight carried on the right foot. The same is true for all the other steps with the exception of the "Left Turn" and the "Chasses," if it is to be executed to the right.

Figure 7:
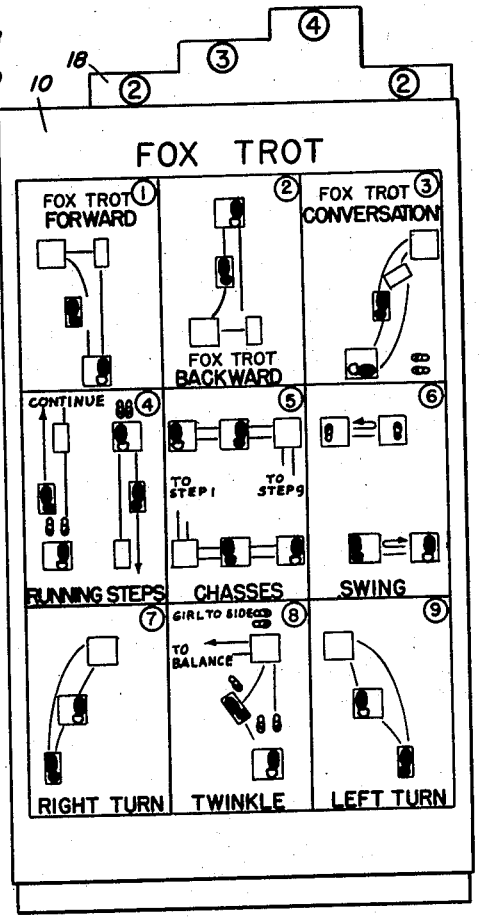

The slider may then be operated by pressing on the notch designated (1). Then, as shown in Figure 7, footprint symbols are caused to appear through the windows to indicate the next step which should be taken. For example, during the "Forward" step in the Fox Trot, a man's left foot should be advanced forwardly and partly to one side and the body weight should be transferred from the right to the left foot. In doing the "Right Turn" the man's left foot should be placed to the rear and slightly to one side and the body weight should be transferred to the left foot. In executing the "Chasses" to the left a man's left foot should be placed directly to the left and the body weight should be transferred to this foot. An indication of the next step to be taken in executing each of these routines may be gained by pressing on that one of notches 19 which is designated 2 to cause the edge of the notch to become adjacent to the top of windowed member 10, as shown in Figure 8. Then it may be observed from the footprint symbols appearing at the windows that the next step to be taken in executing the "Forward" step is to place the right foot forward and to transfer the body weight to this foot. The next step for a man to take in executing the "Right Turn" is to twist his right foot to the right and transfer his body weight back to this foot.

Figure 10:
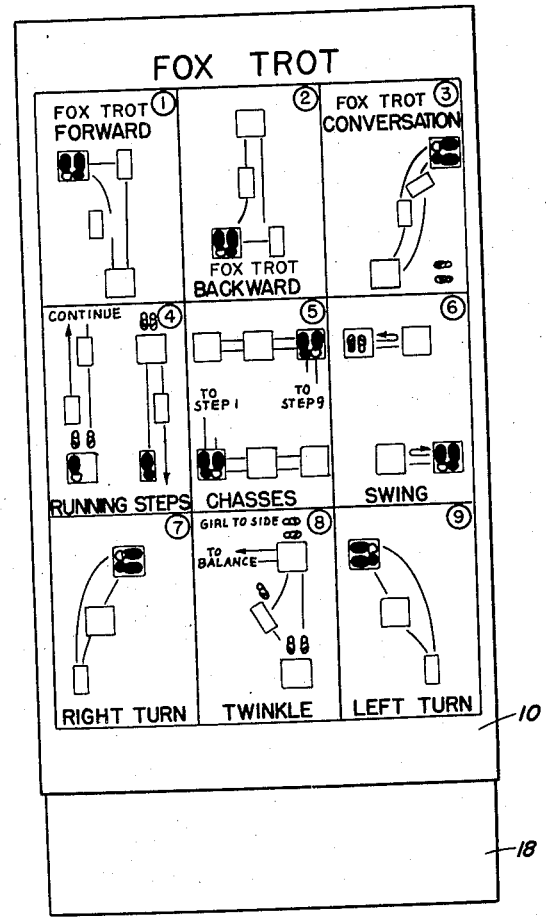

An indication of the next subsequent placement of the feet to be made in carrying out the proper routine for any of the designated steps may then be observed by pressing the next notch on the end of sliding member 18 to cause it to become adjacent to the top edge of member 10, as shown in Figure 9, and likewise the final step to be taken in executing any of the designated steps may be found by pressing the notch designated (4), thereby causing sliding member 18 to slide until the edge of said notch is adjacent the top edge of number 10, as shown in Figure 10.

Figure 4:
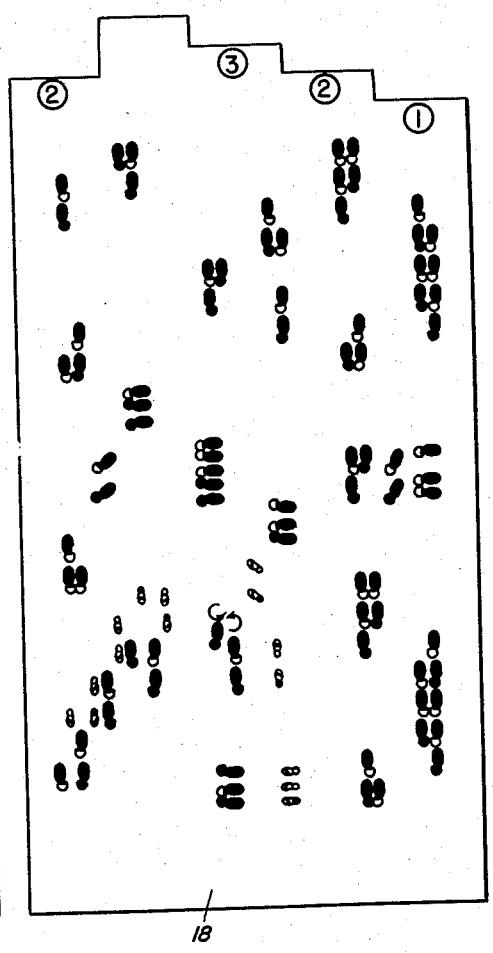
Figure 4 is an elevation of the reverse side of a sliding member.
Figure 5:
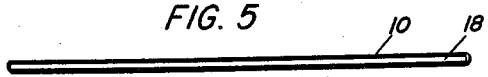
Figure 5 is an elevation from one end of the assembled device of the invention.

The embodiment represented by Figures 6 to 10 relates only to nine designated steps as hereinbefore mentioned which are preferably danced to a Fox Trot rhythm and the embodiment illustrated by the reverse side of member 10 as shown in Figure 2 and the reverse side of the assembled device as shown in Figure 4 relates to another nine steps which may be executed to Fox Trot rhythm.

However, the device is equally applicable to Rumba rhythm, Waltz rhythm, Samba rhythm, and the like, and equally preferred for such rhythms and the omission of illustration of said embodiments has been made solely for the purpose of minimizing the number of drawings in this application.

In such other embodiments of the device for use in connection with other rhythms of the types mentioned the pattern and grouping of windows may be changed, the number of notches in the sliding member may be changed and the pattern of footprints appearing on the sliding member is of course necessarily changed.

It may thus be seen that the invention is broad in scope and is to be limited only by the claims.

Having thus disclosed my invention, I claim:

1. A device for indicating sequential pedal positions in dancing, comprising a first member having delineated thereon the designations of a plurality of dance step sequences and a plurality of quadrilateral windows disposed in groups so that a group is associated with each such designation, having also delineated thereon lines connecting said windows and indicating suitable sequential relationships between the windows in each such group, a second member slidably disposed adjacent the rear surface of said first member provided with a plurality of rectangularly extended portions disposed in stepwise relation at one end thereof and having disposed on the surface thereof adjacent said first member a plurality of pedal-position indicating indicia comprising footprint symbols, said extended portions arranged to be successively forced into adjacency with an edge of said first member to thereby cause said second member to slide under said first member and to bring said pedal indicia in sequential order into registered relation with windows in each of said groups.

2. The device of claim 1 wherein said first member consists of one side of an envelope having each of its sides closed and each of its ends open and said second member is slidably disposed within said envelope.

References Cited in the file of this patent

UNITED STATES PATENTS

| | | |
|---|---|---|
| 1,941,777 | Amos | Jan. 2, 1934 |
| 1,974,901 | Stadler | Sept. 25, 1934 |
| 2,166,372 | Roeder | July 18, 1939 |
| 2,228,403 | Ross | Jan. 14, 1941 |
| 2,402,109 | Williams | June 11, 1946 |
| 2,657,610 | Carran | Nov. 3, 1953 |

FOREIGN PATENTS

| | | |
|---|---|---|
| 786,693 | France | June 17, 1935 |
| 988,563 | France | May 9, 1951 |